T. L. FAWICK.
POWER TRANSMISSION DEVICE.
APPLICATION FILED MAY 3, 1917.

1,267,527.

Patented May 28, 1918.

Inventor,
T. L. Fawick, by
G. C. Kennedy
Attorney

UNITED STATES PATENT OFFICE.

THOMAS L. FAWICK, OF WATERLOO, IOWA.

POWER-TRANSMISSION DEVICE.

1,267,527.  Specification of Letters Patent.  Patented May 28, 1918.

Application filed May 3, 1917. Serial No. 166,179.

*To all whom it may concern:*

Be it known that I, THOMAS L. FAWICK, a citizen of the United States of America, and a resident of Waterloo, Blackhawk county, Iowa, have invented certain new and useful Improvements in Power-Transmission Devices, of which the following is a specification.

My invention relates to improvements in power transmission devices, and particularly to those used on motor-driven vehicles, such as tractors and the like, and the object of my improvement is to supply such a device with coacting elements adapted to effect rotation of either of a pair of traction-wheel axles independently of the other, to connect both rigidly to rotate together, or to dissociate them both from the actuating means.

Figure 1:
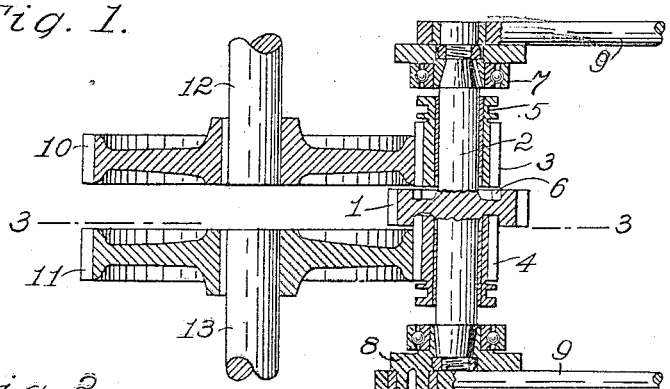
Figure 2:
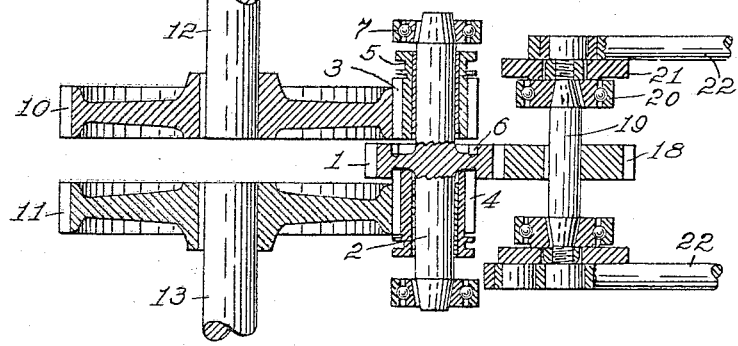
Figure 3:
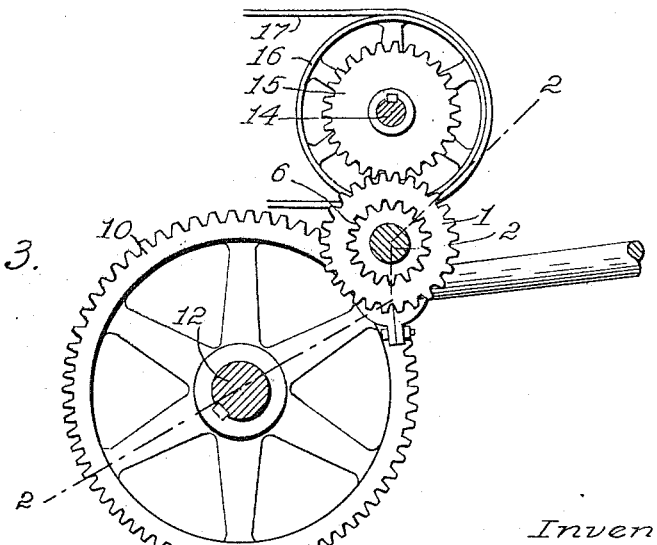

This object I have accomplished by the mechanism which is hereinafter described and claimed, and which is illustrated in the accompanying drawings, in which Figure 1, is an inclined section of my device taken through Fig. 3, on the broken line 2—2 thereof; Fig. 2 is a like section taken through a modified form of the device, and Fig. 3 is a vertical longitudinal section of the device, taken on the broken line 3—3 of said Fig. 1.

Similar numerals of reference denote corresponding parts throughout the several views.

The numerals 10 and 11 denote a pair of like relatively large gear-wheels fixedly mounted on rotatable shafts 12 and 13 respectively, which latter may carry traction wheels not shown. The shafts are in alinement, and the teeth of said gear wheels are in constant mesh with the wider teeth of like pinions 3 which are loosely mounted for a limited extent of longitudinal sliding movements on the crank-shaft 2.

The crank-shaft 2 (see Fig. 1) has its ends rotatably mounted in anti-friction bearings 7 on fixed spaced supports, and has cranks and crank-pins 8 on its ends without said bearings, connecting-rods 9 being pivotally mounted on the crank-pins.

Positioned medially between the gear-wheels 10 and 11 and said pinions, is a gear-wheel 1 which is integral with the crank-shaft 2, and which has in its opposite faces the clutch-element 6 adapted to mesh with said pinions when the latter are slidably moved along said shaft toward them by shifting-means not shown operative in the annular grooves 5 on the outwardly extended hubs of the pinions.

In Fig. 3 is shown a counter-shaft 14 on which is keyed a gear-wheel 15 in constant mesh with the gear-wheel 1. On this shaft 14 is a belt-wheel 16 carrying a driving-belt 17.

In Fig. 2 is shown a modification, wherein another shaft 19 is used, its ends rotatably mounted in anti-friction bearings 20, and having a gear-wheel 18 mounted fixedly thereon in constant mesh with the gear-wheel 1. Cranks and crank-pins 21 are fixed on the outer end of this shaft 19 to carry the connecting-rods 22. This latter arrangement permits the connecting-rods to be brought nearer together, as may be necessary when cylinders and pistons of relatively small diameters are used in pairs side by side.

In the transmission-device shown, the pinions 3 and 4 may be independently shifted into or out of engagement with the clutch-elements 6 in the opposite faces of the intermediate gear-wheel 1, while remaining in mesh respectively with the gear-wheels 10 and 11. By this means, when both pinions 3 and 4 are shifted into mesh with said clutch-elements 6, both gear-wheels 10 and 11 will be rotated together, but when the pinions are both out of mesh with the clutch-elements, the pinions will not be rotated. This shifting of either pinion into mesh with its mating clutch-element 6 will rotate only the gear-wheel which is in mesh therewith, when the other pinion is out of mesh with its respective mating clutch-element.

This transmission device is particularly adapted for use with and to be actuated by a steam-engine, which will render it reversible in action.

When used on a tractor or other motor-driven vehicle, independent brakes may be supplied to coact therewith to hold either shaft 12 or 13 fixedly when it is desired to thereby fix one traction-wheel as a pivot for another, but I do not claim this feature in this application.

Having described my invention, what I claim as new, and desire to secure by Letters Patent, is:

1. In a power transmission-device, alined spaced like driven gears, a driving-shaft having clutch-elements thereon between said driven gears, and like pinions loosely slidably mounted on said driving-shaft on opposite sides of said clutch-elements and independently shiftable into or out of mesh with said clutch-elements, the pinions having wider teeth than said driven gears and in constant mesh therewith respectively.

2. In a power transmission-device, alined rotatable shafts, like driven gear-wheels fixedly mounted thereon, a crank-shaft provided at opposite ends with cranks having crank-pins, and connecting-rods pivotally mounted on the crank-pins, like clutch elements fixedly mounted on the crank-shaft between said driven gears, and like pinions loosely slidably mounted on said crank-shaft and independently shiftable into or out of mesh with said clutch-elements, the pinions having wider teeth than said driven gears and in constant mesh therewith respectively.

3. In a power transmission-device, alined spaced, like driven gears, a driving-shaft, a gear-wheel fixed thereon intermediate said driven-gears, said intermediate gear having like clutch-elements formed in its opposite faces, a gear-wheel in mesh with said intermediate gear, and like pinions loosely slidably mounted on said driving-shaft and independently shiftable into or out of mesh with said clutch-elements, the pinions having wider teeth than said driven gears and in constant mesh therewith respectively.

Signed at Waterloo, Iowa, this 28th day of April, 1917.

THOMAS L. FAWICK.

Witness:
PEARL M. STANTON.